(12) United States Patent
Bambach

(10) Patent No.: US 12,462,781 B2
(45) Date of Patent: Nov. 4, 2025

(54) SYSTEMS, DEVICES AND METHODS FOR MOUNTING A TRANSDUCER

(71) Applicant: Ryan Bambach, Arthur (CA)

(72) Inventor: Ryan Bambach, Arthur (CA)

(73) Assignee: 2140968 Ontario Ltd., Arthur (CA)

( * ) Notice: Subject to any disclaimer, the term of this patent is extended or adjusted under 35 U.S.C. 154(b) by 0 days.

(21) Appl. No.: 18/631,673

(22) Filed: Apr. 10, 2024

(65) Prior Publication Data

US 2024/0339097 A1 Oct. 10, 2024

Related U.S. Application Data

(60) Provisional application No. 63/458,346, filed on Apr. 10, 2023.

(51) Int. Cl.
*G10K 11/00* (2006.01)

(52) U.S. Cl.
CPC .................. *G10K 11/006* (2013.01)

(58) Field of Classification Search
None
See application file for complete search history.

(56) References Cited

U.S. PATENT DOCUMENTS

| | | | |
|---|---|---|---|
| 3,752,431 A | 8/1973 | McBride | |
| 3,989,216 A * | 11/1976 | Veatch | G10K 11/004 248/278.1 |
| 4,285,485 A * | 8/1981 | Burke | A01K 79/00 367/173 |
| 4,852,416 A * | 8/1989 | Boone | G01B 17/00 73/431 |
| 4,979,153 A * | 12/1990 | Terry | A01K 79/00 340/573.2 |
| 9,947,309 B2 * | 4/2018 | Stokes | G10K 11/006 |
| 10,836,461 B1 | 11/2020 | Smith | |
| 11,796,661 B2 * | 10/2023 | Caspall | G01S 7/521 |

(Continued)

OTHER PUBLICATIONS

RyTek Marine. Garmin Livescope Q&A. URL: [https://www.facebook.com/groups/438053980427866/posts/1176395446593712/]. Nov. 28, 2022. (Year: 2022).*

(Continued)

*Primary Examiner* — Isam A Alsomiri
*Assistant Examiner* — Jonathan D Armstrong
(74) *Attorney, Agent, or Firm* — Smart & Biggar LP

(57) ABSTRACT

Systems, devices and methods for mounting a transducer to a boat are described herein. The devices include a first mounting member that has a body and a coupling portion extending outwardly from the body. The coupling portion is configured to be directly or indirectly secured to a portion of the boat. The device also has a second mounting member movably coupled to the first mounting member. The second mounting member has a body configured to be directly or indirectly secured to the transducer. The device also includes a coupling assembly to movably couple the first mounting member to the second mounting member. The device is movable between a first operating position where the transducer is operable in a first mode when the transducer is secured to the device and a second operating position where the transducer is operable in a second mode when the transducer is secured to the device.

7 Claims, 19 Drawing Sheets

(56) References Cited

U.S. PATENT DOCUMENTS

| | | | |
|---|---|---|---|
| 11,875,766 B2* | 1/2024 | Vance | B63H 20/007 |
| 11,921,200 B1* | 3/2024 | Clark | G01S 15/89 |
| 11,971,478 B2* | 4/2024 | Combs | G01S 7/56 |
| 2010/0059219 A1* | 3/2010 | Roberts | E21B 47/0025 |
| | | | 166/250.01 |
| 2015/0294660 A1* | 10/2015 | Stokes | F16M 11/10 |
| | | | 367/173 |
| 2024/0377517 A1* | 11/2024 | Berscheid | G01S 7/521 |

OTHER PUBLICATIONS

RyTek Marine's Garmin LVS34's RTG3634 Multi-View Transducer Mount Introduction. May 21, 2022. https://www.youtube.com/watch?v=rzOB38nuJ3Y (Year: 2022).*

* cited by examiner

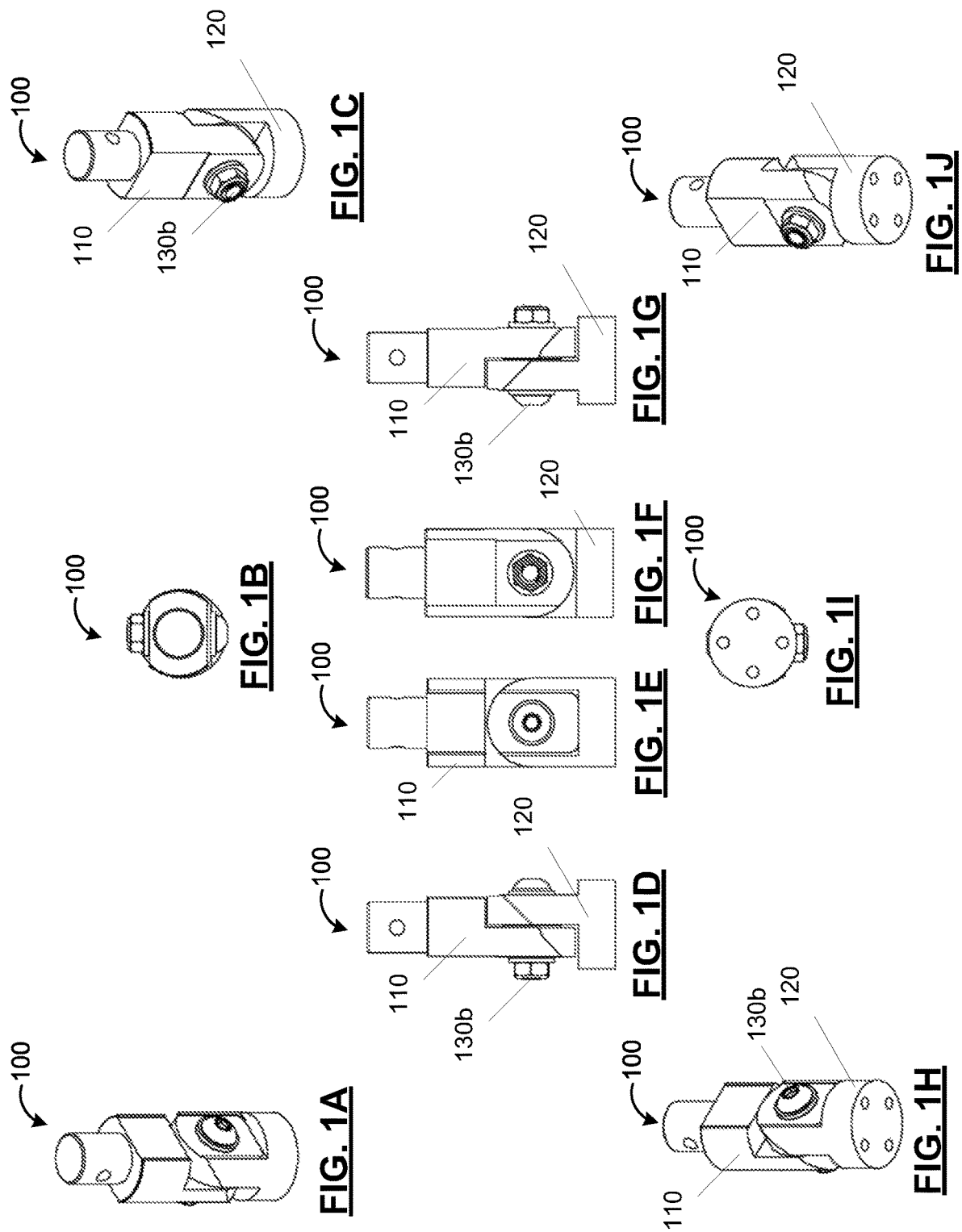

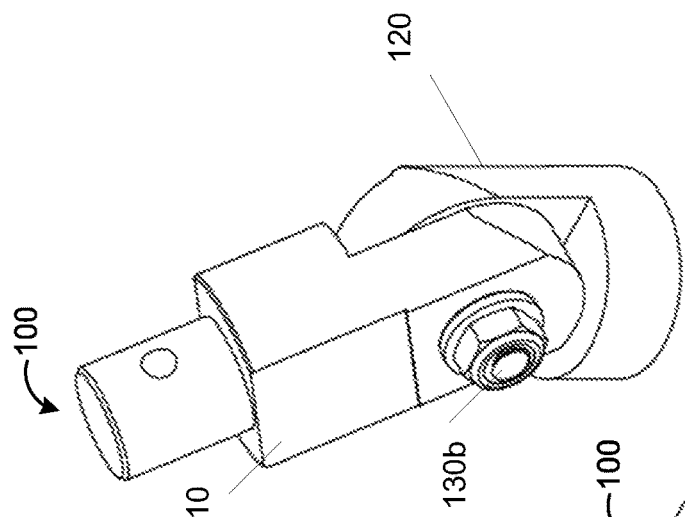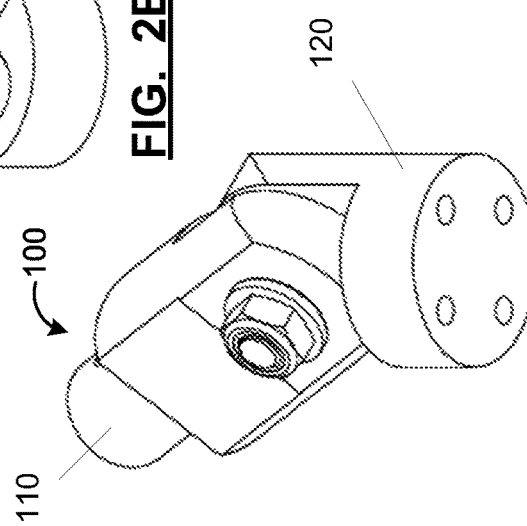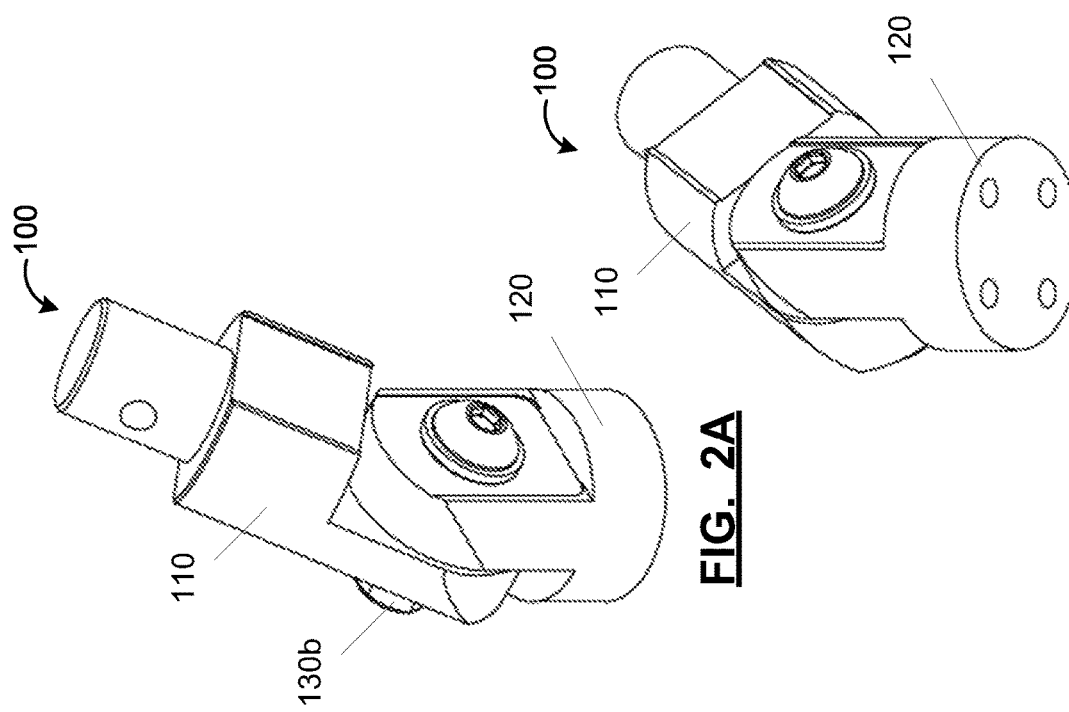

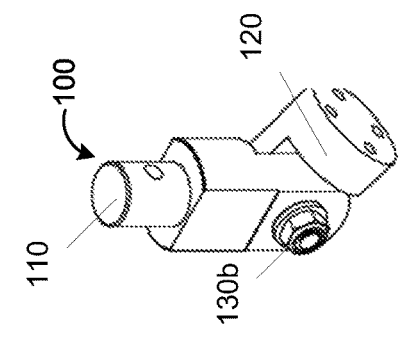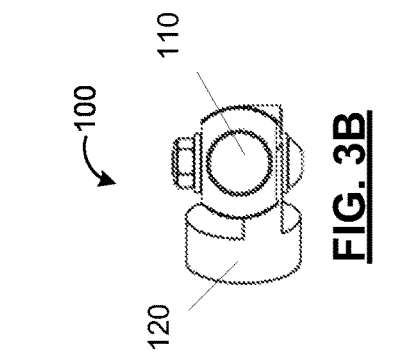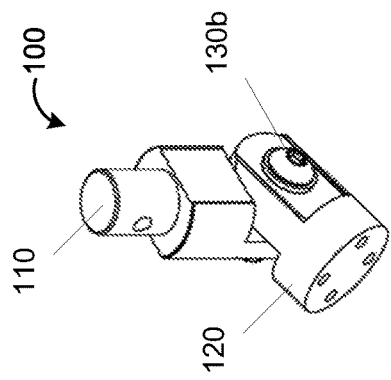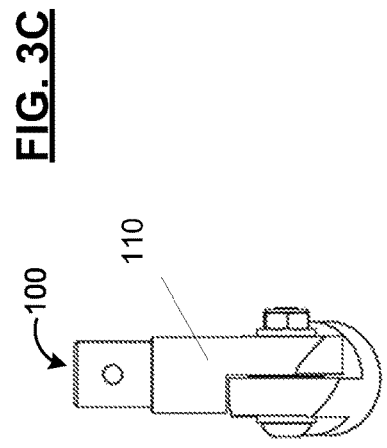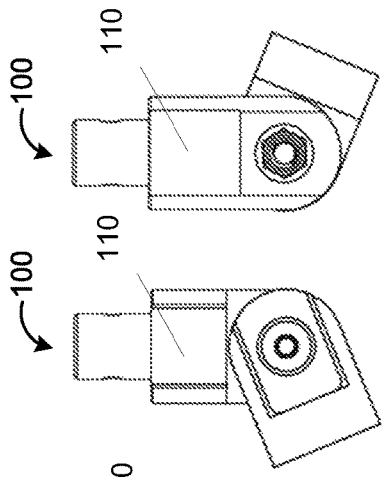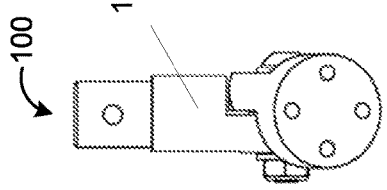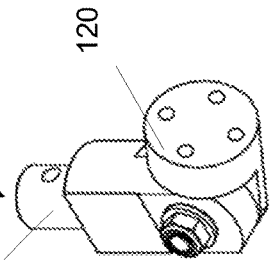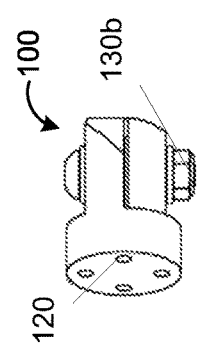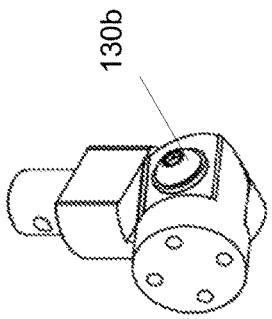

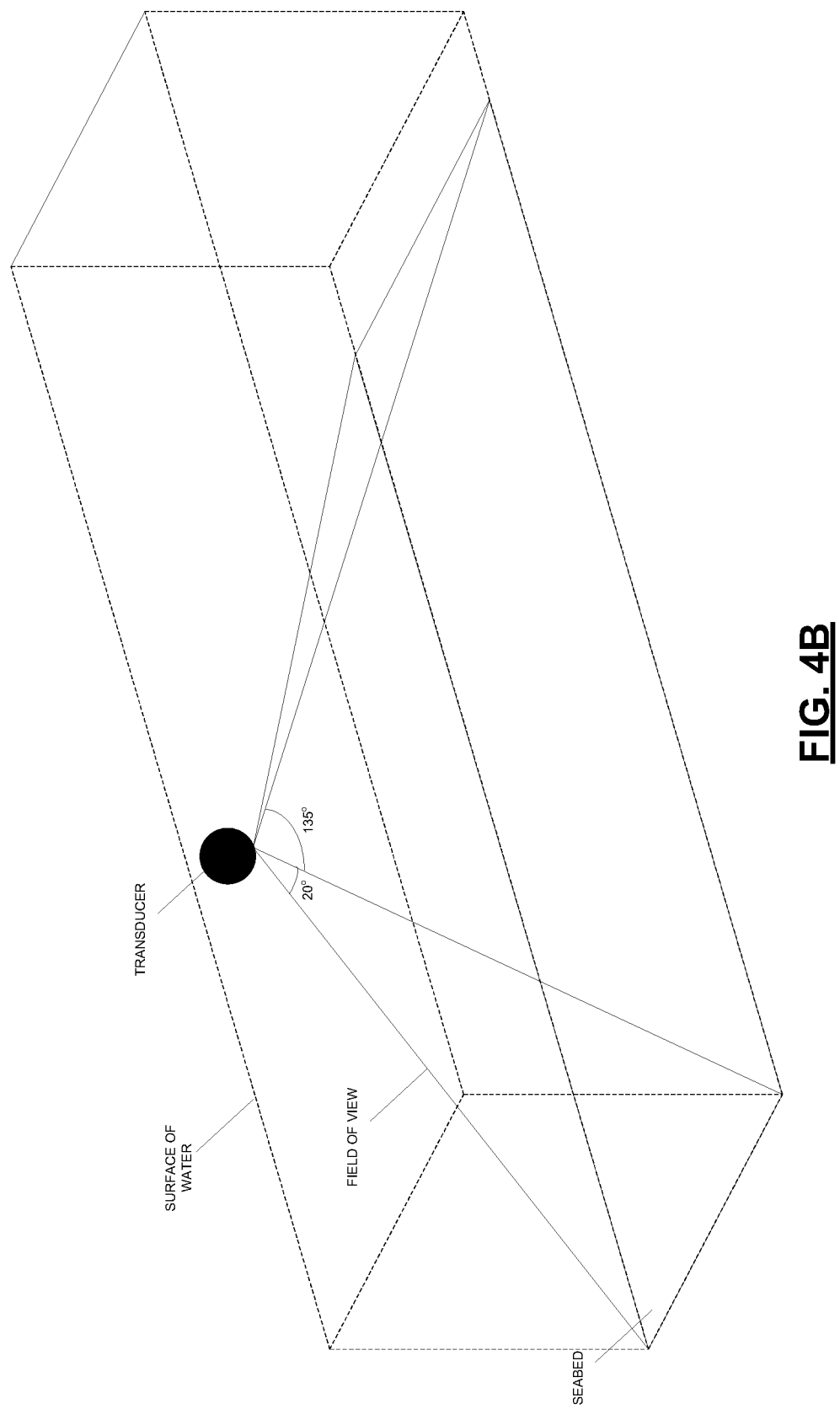

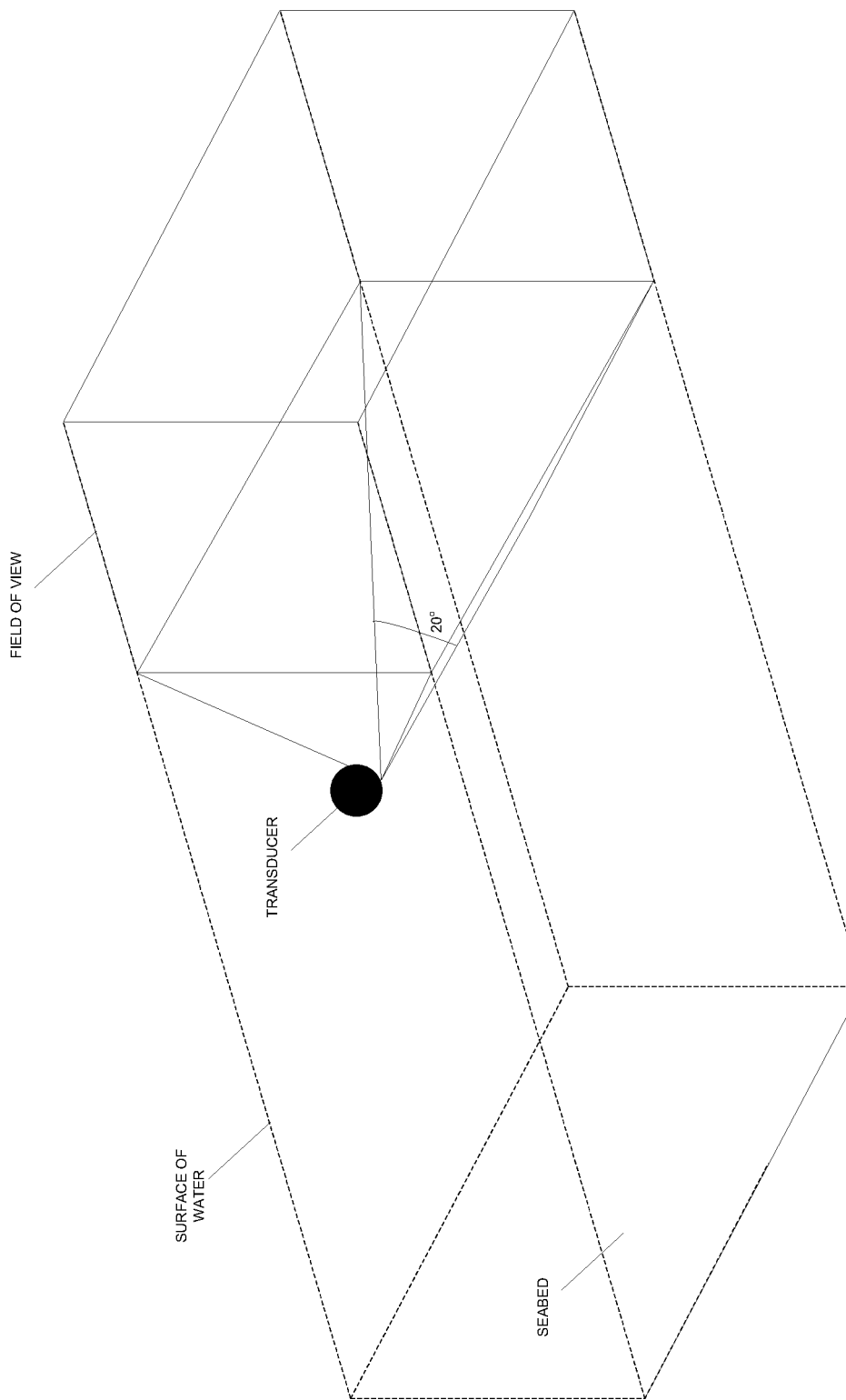

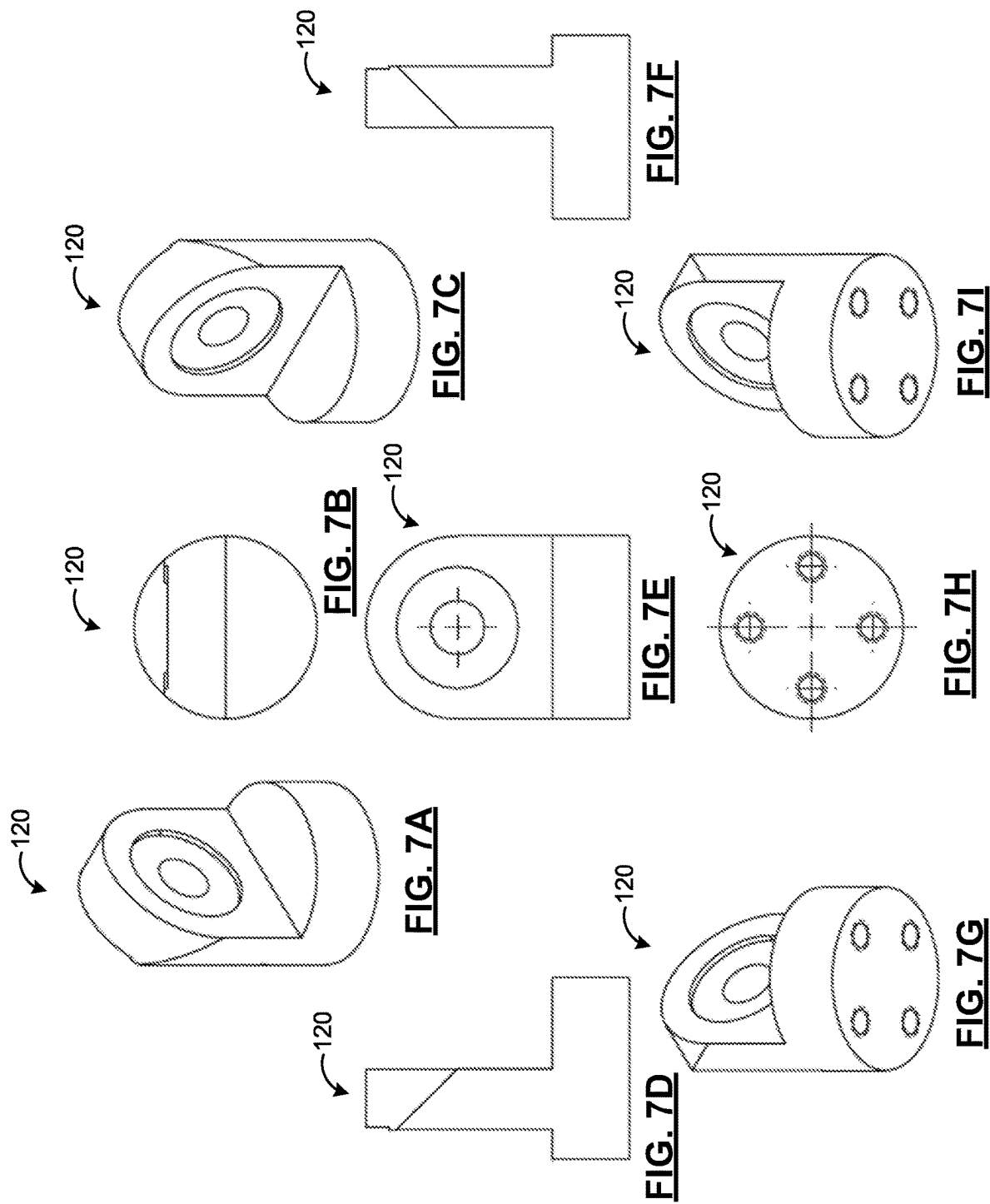

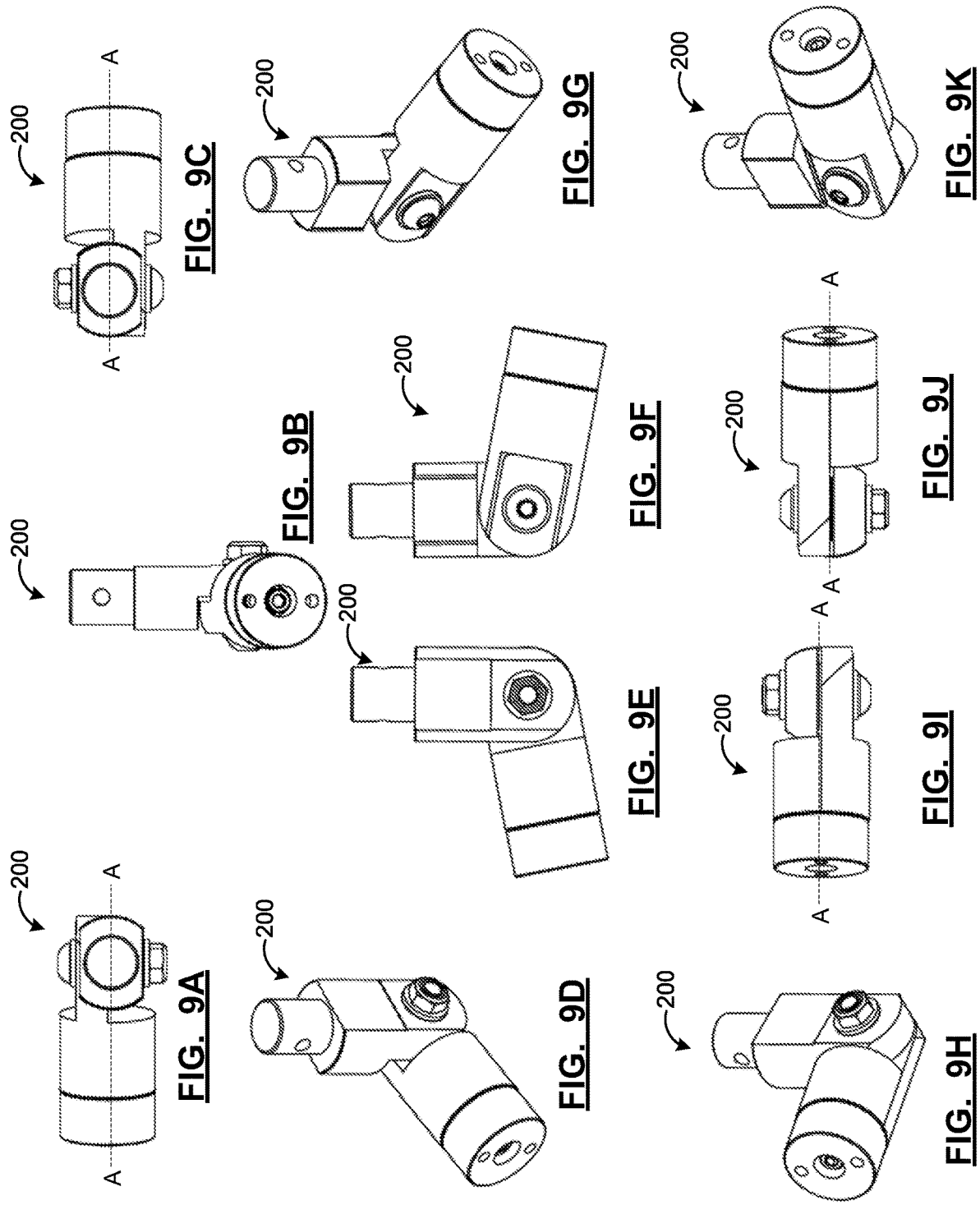

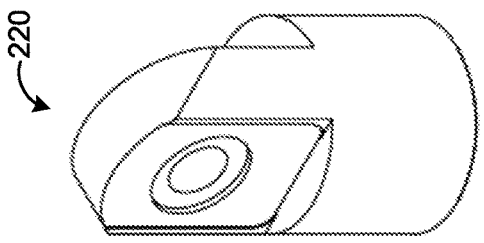
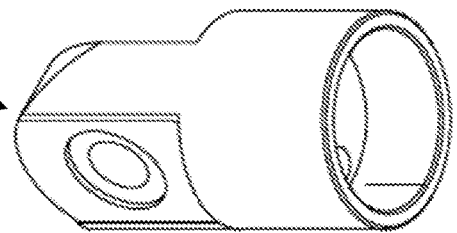
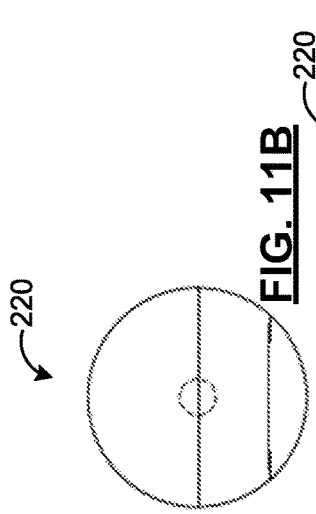
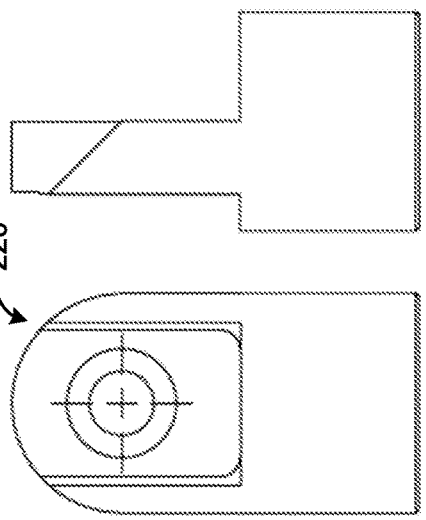
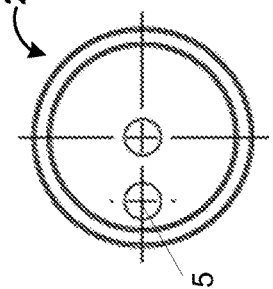
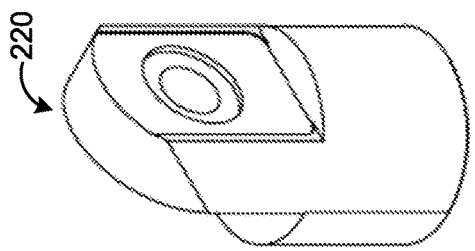
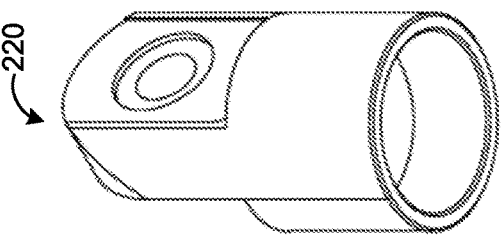
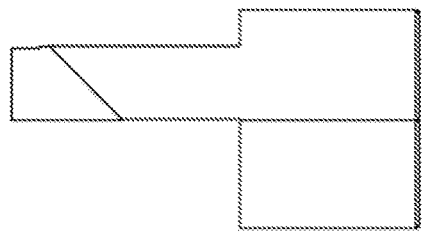

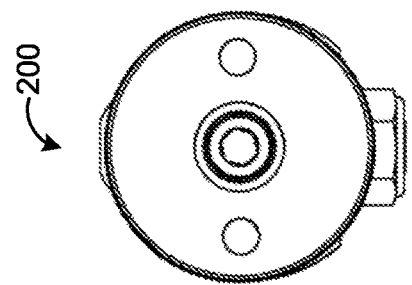
FIG. 13B
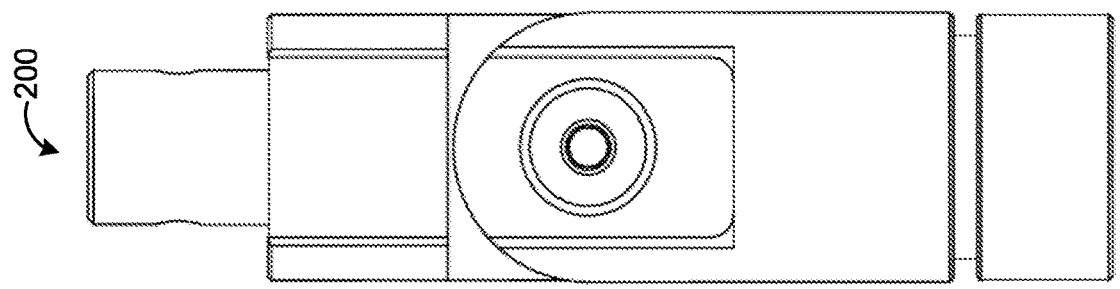
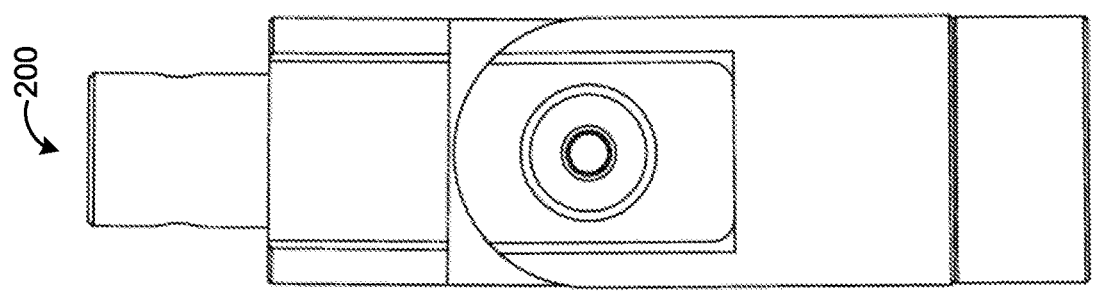
FIG. 13A

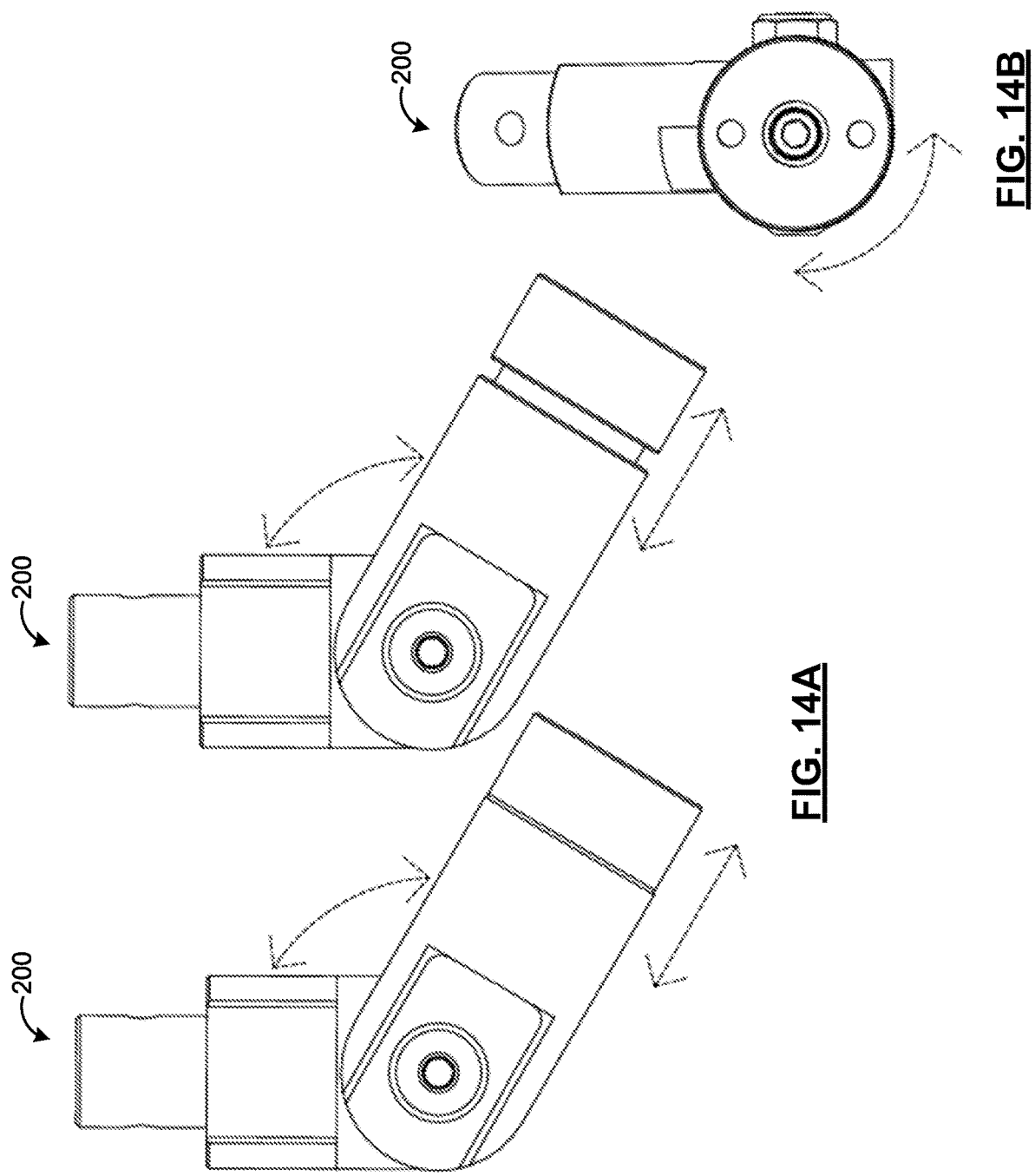

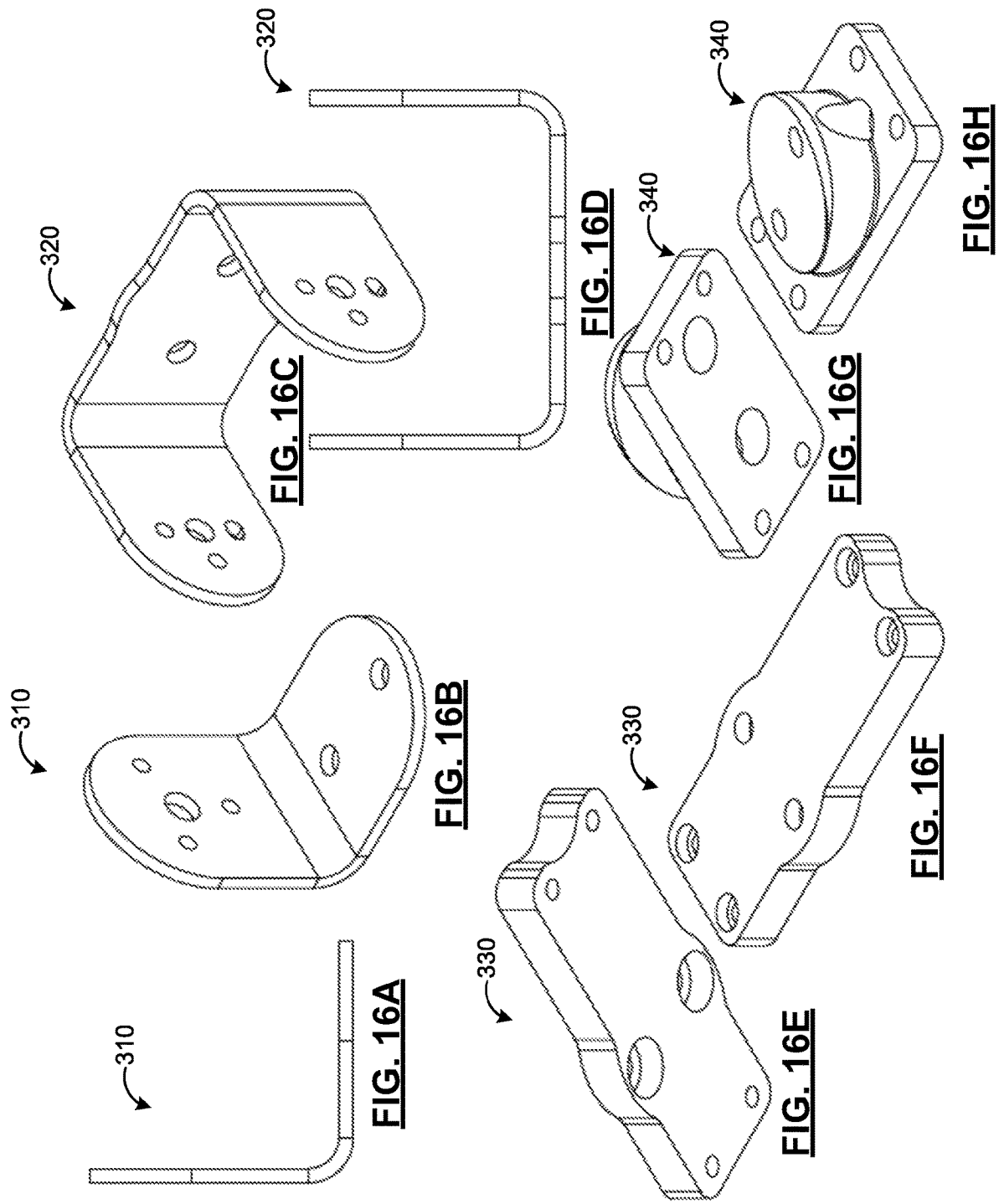

1

SYSTEMS, DEVICES AND METHODS FOR MOUNTING A TRANSDUCER

CROSS-REFERENCE TO RELATED PATENT APPLICATIONS

This application claims the benefit of U.S. Provisional Patent Application No. 63/458,346, filed on Apr. 10, 2023. The entire contents of U.S. Provisional Patent Application No. 63/458,346 are hereby incorporated by reference.

FIELD

This disclosure relates generally to systems, device and methods for mounting a transducer, and more specifically to systems, devices and methods for mounting a transducer to a boat.

BACKGROUND

Advances in fish finding devices, or fish finders, have led to their increased use both recreationally and commercially for locating fish. Fish finders typically include a viewing screen, a central processing unit (CPU), a power supply and a transducer that is positioned in the water and transmits and receives sound waves to locate objects. The transducer emits the sound waves into the water. After the sound waves strike an object, they are reflected back to the transducer where they are detected. The CPU calculates the distance from the transducer to the object based on the time it took for the sound waves to return to the transducer. This information is then displayed on the viewing screen.

The CPU, power supply and viewing screen are positioned in the boat for the user. The transducer is mounted to a portion of the boat and positioned so that the transducer can both emit and detect the sound waves in the water.

Transducers can be mounted to the exterior or the interior surface of a hull. However, the positioning of the transducer is essential for the fish finder to report accurate readings. The transducer may be above or below the surface of the water to properly emit and receive the sound waves.

Traditional transducer mounts are not easily adapted for use on many types of boats. Further, as more expensive system are released, users are desirous of having mounts that are more rigid and secure and restrict movement of the transducer when it is in the water.

Accordingly, there is a need for a new mount that can be used to secure a fish finding transducer to a boat.

SUMMARY

In accordance with a broad aspect, devices for mounting a transducer to a boat are described herein. The devices include a first mounting member having a body and a coupling portion extending outwardly from the body. The coupling portion is configured to be directly or indirectly secured to a portion of the boat. The devices also include a second mounting member movably coupled to the first mounting member. The second mounting member has a body configured to be directly or indirectly secured to the transducer. The devices also include a coupling assembly configured to movably couple the first mounting member and the second mounting member together and to provide for the device to be movable between a first position where the transducer is operable in a first mode when the transducer is secured to the device and a second position where the transducer is operable in a second mode when the transducer is secured to the device.

In at least one embodiment, the transducer is secured to the device, the transducer is aligned with a longitudinal axis of at least a portion of the device when the device is in the first position and in the second position.

In at least one embodiment, the first mounting member is movable relative to the second mounting member about an axis defined by a fastener of the coupling assembly.

In at least one embodiment, the first mounting member includes a flange extending outwardly from the body, the flange being configured to receive the fastener of the coupling assembly.

In at least one embodiment, the second mounting member includes a flange extending outwardly from the body, the flange being configured to receive the fastener of the coupling assembly.

In at least one embodiment, at least one of an inner surface of the flange of the first mounting member and an inner surface of the flange of the second mounting member includes a recessed portion to receive a bushing of the coupling assembly.

In at least one embodiment, the inner surface of the flange of the first mounting member and the inner surface of the flange of the second mounting member each include a recessed portion to receive a respective bushing of the coupling assembly.

In at least one embodiment, at least one of an outer surface of the flange of the first mounting member and an outer surface of the flange of the second mounting member includes a recessed portion to receive a washer of the coupling assembly.

In at least one embodiment, the outer surface of the flange of the first mounting member and the outer surface of the flange of the second mounting member each include a recessed portion to receive a respective washer of the coupling assembly.

In at least one embodiment, the coupling assembly includes a first insert configured to be received in the aperture of the flange of the first mounting member and a second insert configured to be received in the aperture of the flange of the second mounting member, the fastener being sized to be received in the first insert and in the second insert.

In at least one embodiment, a bottom surface of the second mounting member is configured to be directly or indirectly secured to the transducer.

In accordance with another broad aspect, devices for mounting a transducer to a boat are described herein. The devices include a first mounting member having a body and a coupling portion extending outwardly from the body. The coupling portion is configured to be directly or indirectly releasably coupled to a portion of the boat. The devices also include a second mounting member movably coupled to the first mounting member. The second mounting member has a body having a coupling portion extending outwardly from the body. The devices also include a third mounting member movably coupled to the second mounting member. The third mounting member is configured to be releasably coupled to the transducer. The devices also include a first coupling assembly configured to couple the first mounting member and the second mounting member together and to provide for the device to be movable between a first position where the transducer is operable in a first mode when the transducer is secured to the device and a second position where the transducer is operable in a second mode when the transducer is secured to the device. The devices also include a second coupling assembly configured to couple the second mounting member and the third mounting member together and to provide for the device to be movable between the first position where the transducer is operable in a first mode when the transducer is secured to the device and a third position where the transducer is operable in a third mode when the transducer is secured to the device.

In at least one embodiment, the transducer is secured to the device, the transducer is aligned with a longitudinal axis of at least a portion of the device when the device is in the first position, the second position and the third position.

In at least one embodiment, the wherein the first mounting member is movable relative to the second mounting member about an axis defined by a fastener of the first coupling assembly.

In at least one embodiment, the third mounting member is movable about a longitudinal axis of the second mounting member.

In at least one embodiment, the second coupling assembly includes a spring that provides for the third mounting member to be movable in a direction coaxial with the fastener of the second coupling assembly.

In at least one embodiment, the spring biases the third mounting member towards the second mounting member.

In at least one embodiment, the second coupling assembly further comprises a pin configured to be retained within a cavity of the second mounting member.

In at least one embodiment, the third mounting member includes a plurality of apertures in an upper surface thereof, each aperture being configured to receive the pin to restrict rotational movement of the third mounting member relative to the second mounting member.

In accordance with another broad aspect, methods of mounting a transducer to a boat are described herein. The methods include securing a transducer to at least one of the devices described herein and mounting at least one of the devices described herein to the boat.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 1A is a front perspective view from above of a device for mounting a transducer to a boat at a first operating position, according to at least one embodiment described herein.

FIG. 1B is a top view of the device of FIG. 1A.

FIG. 1C is a second front perspective view from above of the device of FIG. 1A.

FIG. 1D is a front view of the device of FIG. 1A.

FIG. 1E is a first side view of the device of FIG. 1A.

FIG. 1F is a second side view of the device of FIG. 1A.

FIG. 1G is a rear view of the device of FIG. 1A.

FIG. 1H is a front perspective view from below of the device of FIG. 1A.

FIG. 1I is a bottom view from above of the device of FIG. 1A.

FIG. 1J is a second front perspective view from below of the device of FIG. 1A.

FIG. 2A is a front perspective view from above of the device of FIG. 1A at a second operating position.

FIG. 2B is a second front perspective view from above of the device of FIG. 1A.

FIG. 2C is a front perspective view from below of the device of FIG. 1A.

FIG. 2D is a second front perspective view from below of the device of FIG. 1A.

FIG. 3A is a front perspective view from above of the device of FIG. 1A at a third operating position.

FIG. 3B is a top view of the device shown in FIG. 3A.

FIG. 3C is a second front perspective view from above of the device shown in FIG. 3A.

FIG. 3D is a front view of the device shown in FIG. 3A.

FIG. 3E is a first side view of the device shown in FIG. 3A.

FIG. 3F is a second side view of the device shown in FIG. 3A.

FIG. 3G is a rear view of the device shown in FIG. 3A.

FIG. 3H is a front perspective view from below of the device shown in FIG. 3A.

FIG. 3I is a bottom view from above of the device shown in FIG. 3A.

FIG. 3J is a second front perspective view from below of the device shown in FIG. 3A.

FIG. 4B shows an example of a boat and an area of water under the boat visualized using a transducer in down mode.

FIG. 4C shows an example of a boat and an area of water under the boat visualized using a transducer in perspective mode.

FIG. 7A is a front perspective view from above of a second member of the device of FIG. 1A, according to at least one embodiment described herein.

FIG. 7B is a top view of the second member shown in FIG. 7A.

FIG. 7C is a rear perspective view from above of the second member shown in FIG. 7A.

FIG. 7D is a front view of the second member shown in FIG. 7A.

FIG. 7E a first side view of the second member shown in FIG. 7A.

FIG. 7F is a second side view of the second member shown in FIG. 7A.

FIG. 7G a front perspective view from below of the second member shown in FIG. 7A.

FIG. 7H a bottom view of the second member shown in FIG. 7A.

FIG. 7I a rear perspective view from below of the second member shown in FIG. 7A.

FIG. 9A is a top view of the device of FIG. 8A at a third operating position.

FIG. 9B is a front view of the device of FIG. 9A.

FIG. 9C is a second top view from above of the device of FIG. 9A.

FIG. 9D is a front perspective view from above of the device of FIG. 9A.

FIG. 9E is a first side view of the device of FIG. 9A.

FIG. 9F is a second side view of the device of FIG. 9A.

FIG. 9G is a second front perspective view from above of the device of FIG. 9A.

FIG. 9H is a front perspective view from below of the device of FIG. 9A.

FIG. 9I is a bottom view of the device of FIG. 9A.

FIG. 9J is a second bottom view from above of the device of FIG. 9A.

FIG. 9K is a front perspective view from below of the device of FIG. 9A.

FIG. 11A is a front perspective view from above of a second member of the device of FIG. 9A.

FIG. 11B is a top view of the second member of FIG. 11A.

FIG. 11C is a rear perspective view from above of the adapter of FIG. 11A.

FIG. 11D is a perspective view from below of the adapter of FIG. 11A.

FIG. 11E is a front view of the adapter of FIG. 11A.

FIG. 11F is a front perspective view of the adapter of FIG. 11A.

FIG. 11G is a front perspective view from below of the adapter of FIG. 11A.

FIG. 11H is a bottom view of the adapter of FIG. 101A.

FIG. 11I is a rear perspective view from below of the adapter of FIG. 11A.

FIG. 13A is a side view of the device of FIG. 9A showing the movement of the third member of FIG. 12A.

FIG. 13B is a bottom view of the device of FIG. 13A.

FIG. 14A is a side view of the device of FIG. 9A at the third working position showing the movement of the third member of FIG. 12A.

FIG. 14B is a front view of the device of FIG. 14A.

FIG. 16A is a side view of a transducer adapter, according to at least one embodiment described herein.

FIG. 16B is a front perspective view from above of the adapter of FIG. 16A.

FIG. 16C is a front perspective view from above of a second transducer adapter, according to at least one embodiment described herein.

FIG. 16D is a perspective view from below view of the adapter of FIG. 16C.

FIG. 16E is a front perspective view from below of a third transducer adapter, according to at least one embodiment described herein.

FIG. 16F is a front perspective view from above of the adapter of FIG. 16E.

FIG. 16G is a front perspective view from below of a fourth transducer adapter, according to at least one embodiment described herein.

FIG. 16H is a front perspective view from above of the adapter of FIG. 16G.

Figure 4A:
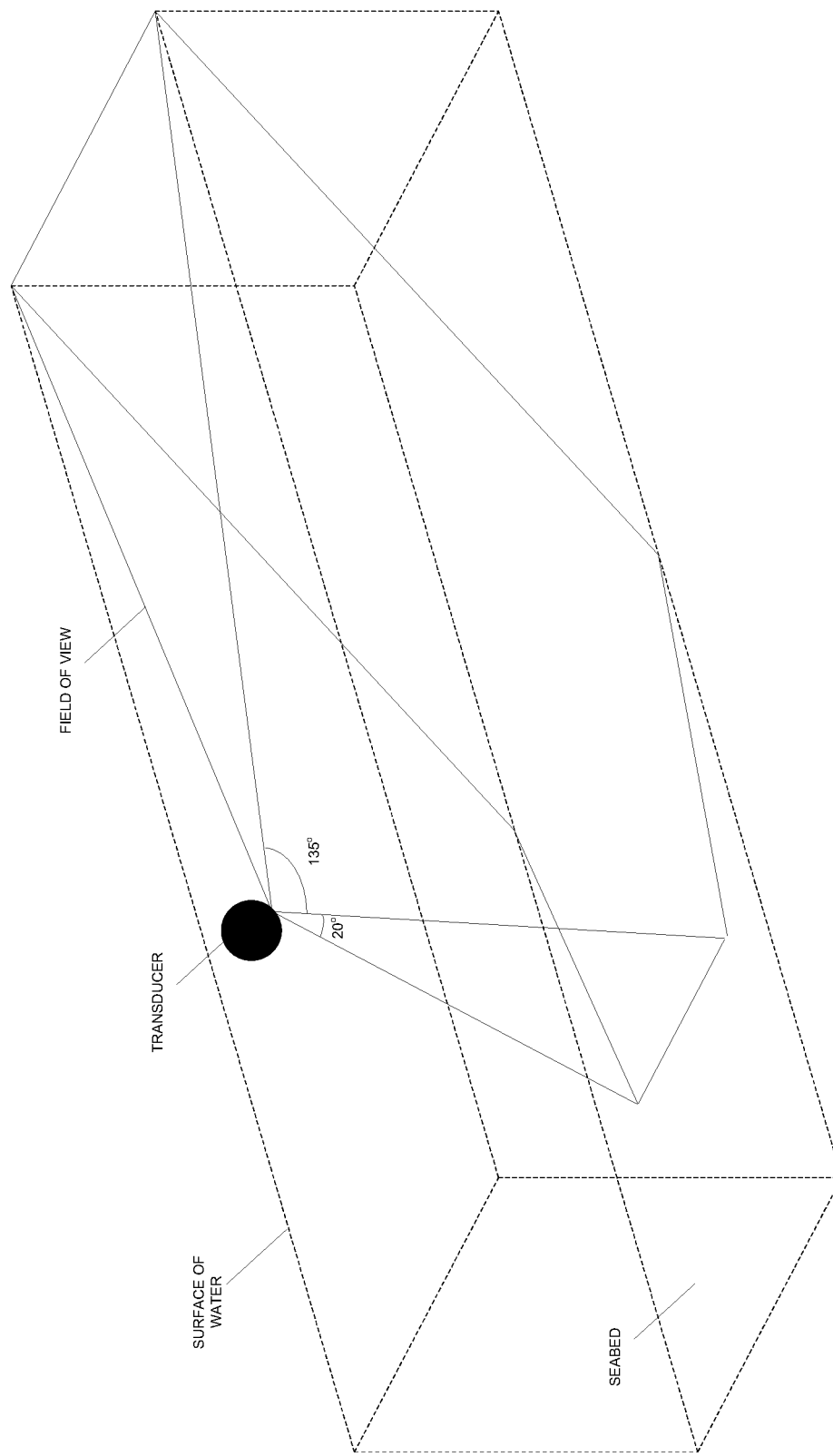
FIG. 4A shows an example of a boat and an area of water under the boat visualized using a transducer in forward mode.

Further aspects and features of the example embodiments described herein will appear from the following description taken together with the accompanying drawings.

DESCRIPTION OF EXAMPLE EMBODIMENTS

Various apparatuses, methods and compositions are described below to provide an example of at least one embodiment of the claimed subject matter. No embodiment described below limits any claimed subject matter and any claimed subject matter may cover apparatuses and methods that differ from those described below. The claimed subject matter are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed subject matter. Any subject matter that is disclosed in an apparatus, method or composition described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially," "about" and "approximately" as used herein mean a reasonable amount of deviation of the modified term such that the end result is not significantly changed. These terms of degree should be construed as including a deviation of the modified term, such as 1%, 2%, 5%, or 10%, for example, if this deviation does not negate the meaning of the term it modifies.

Furthermore, the recitation of any numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that, as used herein, the wording "and/or" is intended to represent an inclusive-or. That is, "X and/or Y" is intended to mean X, Y or X and Y, for example. As a further example, "X, Y, and/or Z" is intended to mean X or Y or Z or any combination thereof. Also, the expression of A, B and C means various combinations including A; B; C; A and B; A and C; B and C; or A, B and C.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Recently, there has been a growing interest in developing new systems, devices and methods for mounting a transducer to a boat.

Reference is now made to FIG. 1, which illustrates a device 100 for mounting a transducer to a boat, according to at least one embodiment described herein. Device 100 is configured to releasably mount to a transducer of a fish finding device as well as to a portion of a boat. Device 100 is configured to control and/or limit movement of the transducer when the transducer is positioned to visualize an area below a surface of water below the device.

FIGS. 1A-1J show device 100 in a first operating position. FIGS. 2A-2D show the device 100 in a second operating position and FIGS. 3A-3J show the device 100 in a third operating position. Briefly, the three operating positions shown in FIGS. 1-3 correspond to three operation positions for operating a transducer. For example, some transducer manufacturers design their transducers to operate in one of three different modes (e.g., or angles, or positions, or views), —namely, down, forward and perspective modes. In at least one embodiment, the devices shown and described herein provide for a user to quickly use and move between all three transducer modes (e.g., down, forward and perspective) without the use of tools or knobs to adjust and/or tighten. It should be understood that although the terms "down mode", "forward mode" and "perspective mode" are used herein, different transducer manufacturers may use different terminology to refer to the views that are provided by different modes of their respective transducers.

Generally, some transducers currently on the market may be described as having three different transducers combined into a single transducer unit. In forward mode, a majority of the signal emitted from these transducers is projected outwardly from the transducer in a forward direction (e.g., relative to the transducer and/or a direction of travel of the boat) with an upper visualization limit of the emitted signal being parallel to with a top surface of the water. For example, in forward mode, the area visualized by the transducer may be an area under the transducer between the upper surface of the water and rearward at an angle of about 135 degrees. An example of a boat showing an area of water under the boat visualized using a transducer in forward mode is shown in FIG. 4A

In down mode, the transducer is tilted downwardly relative to a plane that is parallel with the surface of the water and so that the upper limit of the emitted signal is no longer parallel to with a top surface of the water. Rather, the upper limit is angled to be directed in a forward direction and transverse to a bottom surface of the body of water that is being imaged. In some examples, in down mode, the area imaged under the transducer may be an area under the transducer and in a direction both 67.5 degrees forward of a vertical axis passing through the transducer and a direction 67.5 degrees rearward of the vertical axis passing through the transducer. An example of a boat showing an area of water under the boat visualized using a transducer in forward mode is shown in FIG. 4B.

In perspective mode, the transducer is rotated about an axis that points in a forward direction relative to the transducer (e.g., and the boat). Perspective mode is often used in shallower water to provide for a wider range of view to the user. An example of a boat showing an area of water under the boat visualized using a transducer in forward mode is shown in FIG. 4C.

In each of these modes, the transducer should be positioned in line with the mount when mounted to the boat. More specifically, the transducer should be positioned to be aligned with a longitudinal axis of at least a portion of the mount when the transducer is positioned in each of the different modes. If the transducer is offset from the longitudinal axis of the mount in any one of these modes, there could be a risk of damage to the transducer and/or risk that the transducer may become dislodged from the mount.

In at least one embodiment, the devices shown and described herein can provide for moving a transducer between the different modes described above by controlling a position of the transducer.

Figure 5:
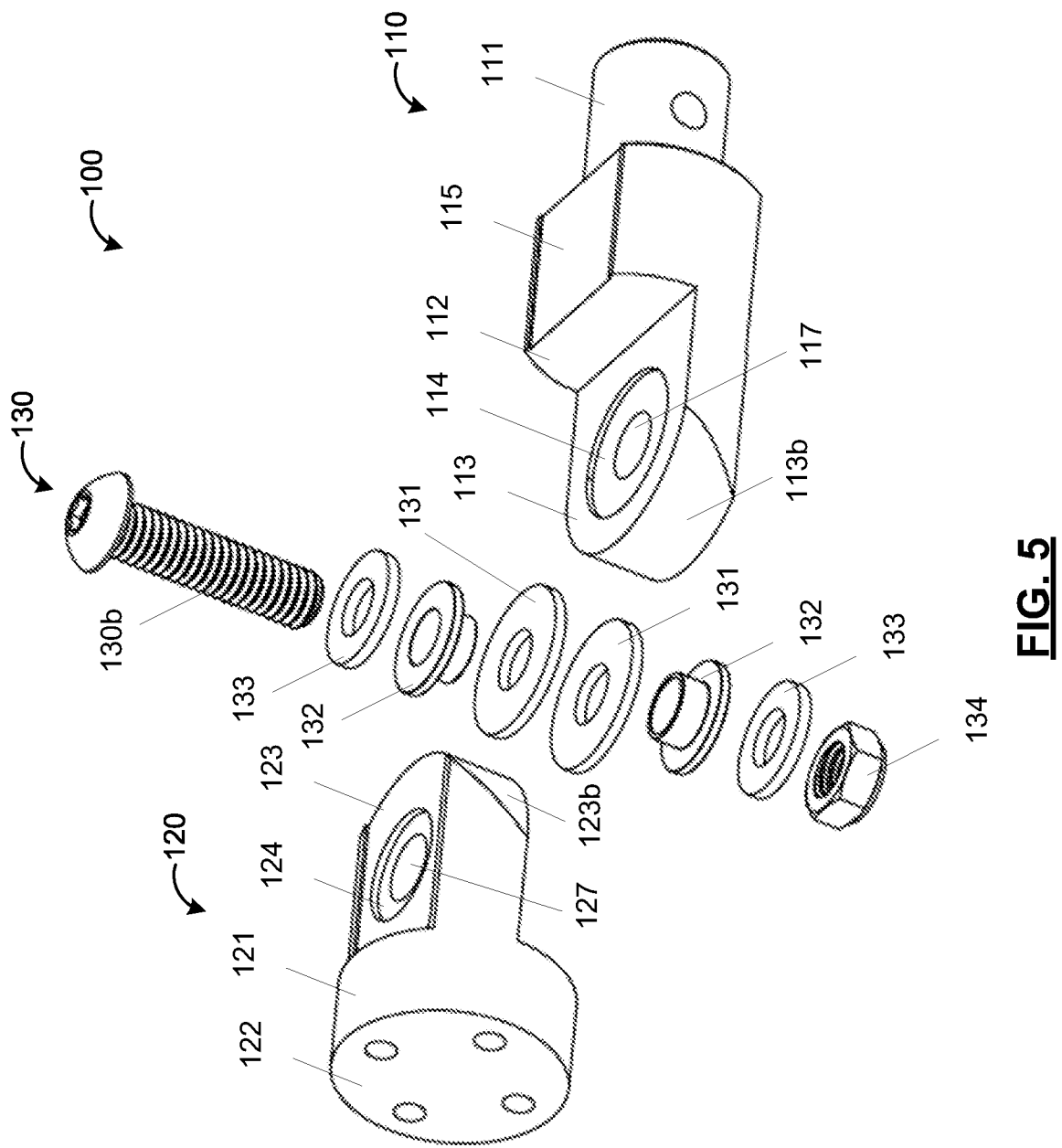
FIG. 5 is an exploded perspective view of the device of FIG. 1A.
Figure 6E:
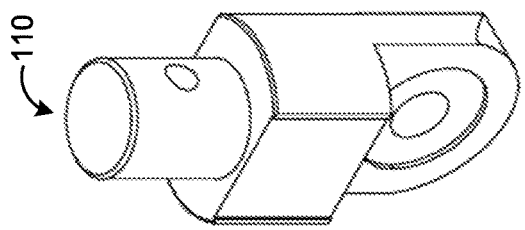
FIG. 6E a first side view of the first member shown in FIG. 6A.
Figure 6G:
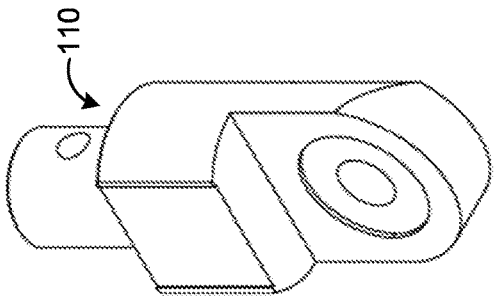
FIG. 6G a front perspective view from below of the first member shown in FIG. 6A.
Figure 6D:
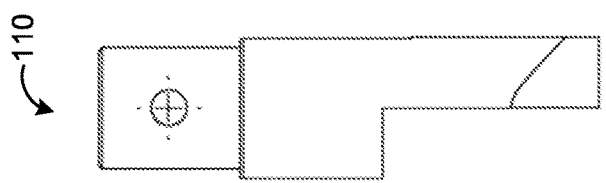
FIG. 6D is a rear view of the first member shown in FIG. 6A.
Figure 6C:
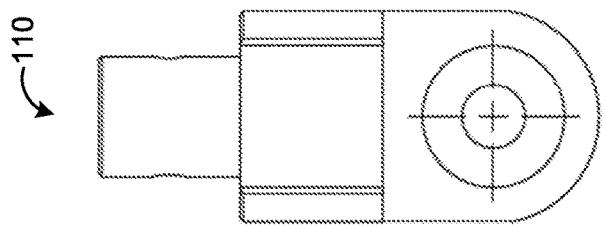
FIG. 6C is a first side view of the first member shown in FIG. 6A.
Figure 6B:
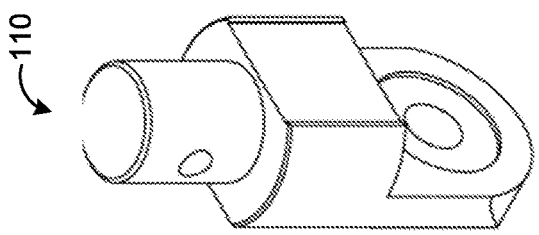
FIG. 6B is a front perspective view from above of the first member shown in FIG. 6A.
Figure 6F:
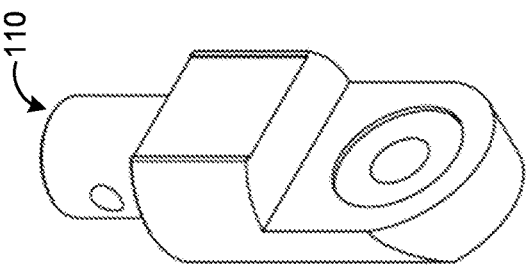
FIG. 6F is a second side view of the first member shown in FIG. 6A.
Figure 6A:
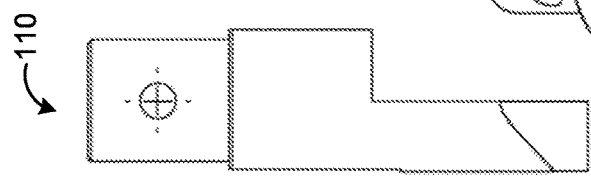
FIG. 6A is a front view of a first member of the device of FIG. 1A.
Figure 8D:
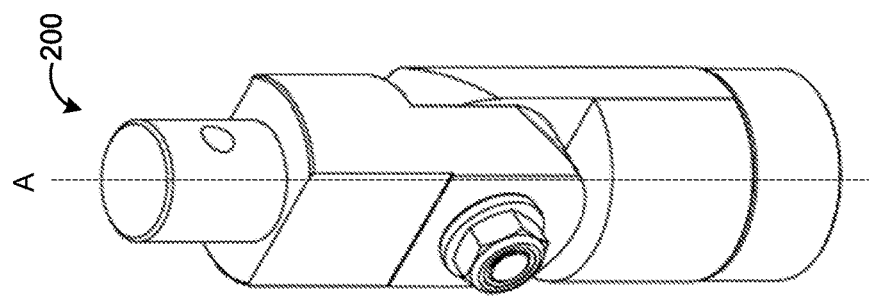
FIG. 8D is a rear perspective view from above of the device of FIG. 8A.
Figure 8C:
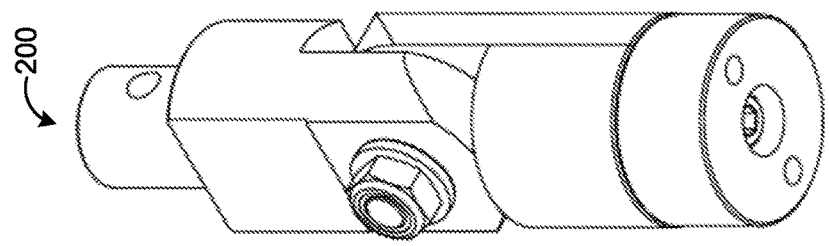
FIG. 8C is another front perspective view from below of the device of FIG. 8A.
Figure 8B:
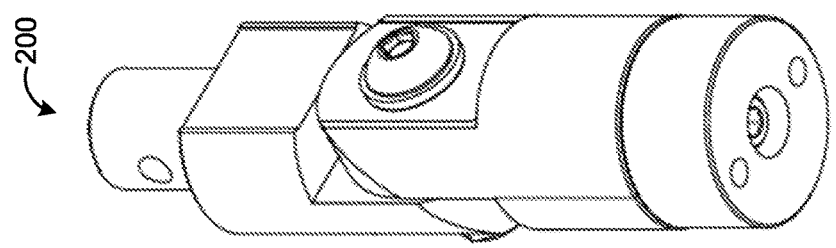
FIG. 8B is a front perspective view from below of the device of FIG. 8A.
Figure 8A:
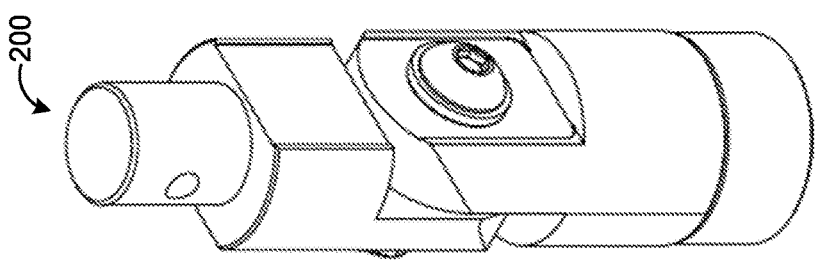
FIG. 8A is a front perspective view from above of the another device for mounting a transducer to a boat at a first operating position, according to another embodiment described herein.

Turning to FIG. 5, illustrated therein is an exploded perspective view of the device 100. As shown therein, device 100 includes a first mounting member 110 and a second mounting member 120. First mounting member 110, shown in greater detail in FIGS. 6A-6G, and second mounting member 120, shown in greater detail in FIGS. 7A-7G, are movably coupled to each other by a coupling assembly 130 including a fastener 130b. Device 100 may be used to move a transducer between a first operating position and a second operating position (e.g., between a forward mode and a down mode) by providing for the first member to rotate about a fastener 130b holding the first member and the second member together. Fastener 130b is transverse to a longitudinal axis of the device 100. In at least one embodiment, fastener 130b is perpendicular to a longitudinal axis of the device 100.

First mounting member 110 is adapted to be releasably coupled to, for example, a connecting rod for being supported by at least a portion of a boat. First mounting member 110 includes a coupling portion 111 extending outwardly from a body 112. Body 112 includes a flange 113 extending outwardly in a direction opposed to the coupling portion 111. Flange 113 is configured to couple to a corresponding flange 123 of second mounting member 120, described in greater detail below. Flange 113 may have a rounded end 113b to ease rotational movement of flange 113 relative to flange 123.

In at least one embodiment, flange 113 includes an inner recessed portion 114 surrounding an opening 117, the recessed portion 114 being sized and shaped to receive a bushing 131 and the opening 117 being sized to receive fastener 130b. Typically, opening 117 will have a diameter slightly larger than a diameter of fastener 130b. Bushing 131 may provide for first mounting member 110 to more easily rotate relative to second mounting member 120. Washer 133 may be made, for example, from a metallic material and contribute to a clamping force of the fastener 130b on the first mounting member 110 and second mounting member 120.

Flange 113 may also include an outer recessed portion 116 sized and shaped to receive one or more bushings 131 and/or one or more inserts 132. Bushings 131 and/or inserts 132 are made of, for example, a nylon plastic material. Bushings 131 and/or inserts 132 provide for first mounting member 110 and second mounting member 120 to more easily rotate relative to each other. Bushings 131 and/or inserts 132 provide for first mounting member 110 and second mounting member 120 to have a low friction joint, for example to remain in a selected position once a user moves first mounting member 110 and second mounting member 120 relative to each other and places the device 100 in t the selected position. For example, the selected position may be a position that is appropriate for positioning a transducer in one of its forward mode, down mode and perspective mode, or the like. Insert(s) 132 extend inwardly into opening 117 and fit between an outer surface of fastener 130b and an inner surface of opening 117. Although FIG. 5 shows first mounting member 110 and second mounting member 120 each having recessed portions to retain a bushing 131, it should be understood that only one of first mounting member 110 and second mounting member 120 may have a recessed portion to retain a bushing 131.

Body 112 may also include a presenting portion 115. Generally, presenting portion 115 may provide a flat surface for presenting a label or decal or engraving or the like that may provide a visual reference for a user and may indicate which mode, or position, the transducer is in when the device 100 is moved between its first and second operating positions (e.g., a mode indicator decal or engraving). In some embodiments, first mounting member 110 may include more than one presenting portion 115. For example, body 112 may include a second presenting portion 115 above flange 113 on an opposite side of body 112 to the presenting portion 115 shown in FIG. 5.

Nut 134 secures coupling assembly 130 together and is torqued during manufacture to provide for frictional engagement that provides for a user to apply a force (e.g. with their hands) to the device and move the first mounting member 110 relative to the second mounting member 120 and also provide for the first mounting member 110 and the second mounting member 120 to remain in any position relative to each other as determined by the user Turning to second mounting member 120, second mounting member 120 is adapted to be releasably coupled to, for example the transducer. For example, a lowermost surface 122 of body 121 may include one or more apertures for receiving, for example, one or more fasteners for securely and removably coupling a transducer to the second mounting member 120.

When a transducer (not shown) is secured to second mounting member 120, lowermost surface 122 of body 121 either abuts a top surface of the transducer or abuts an adaptor that is coupled to the transducer. In both of these scenarios, when the transducer is secured to the second mounting member 120, a longitudinal axis of the device 120 (or of the second mounting member 120 when the second mounting member 120 is not aligned with first mounting member 110) intersects the transducer. Herein, the term "align" when referring to the transducer being "aligned" with a longitudinal axis of at least a portion of the device means that the longitudinal axis of at least a portion of the device (e.g. a longitudinal axis passing through the first mounting member 110 and the second mounting member 120 when the first mounting member 110 and the second mounting member 120 are aligned with each other, or of the second mounting member 120 when the first mounting member 110 and the second mounting member 120 are unaligned with each other) intersects the transducer. Herein, the second mounting member 120 of the device is configured such that when a transducer is secured to the second mounting member, either directly or indirectly by way of an adaptor or the like, the transducer is aligned with a longitudinal axis of at least a portion of the device 100 when the transducer is positioned to be operated in its forward mode and its down mode.

Second mounting member 120 includes a body 121 having surface 122 configured to securely receive and/or mount to the transducer.

Body 121 also includes coupling flange 123 extending outwardly from body 121. Flange 123 mimics flange 133 and extends outwardly in a direction opposed to the surface 122. Flange 113 is configured to couple to corresponding flange 113 of first mounting member 110. Flange 123 may also have a rounded end 123b to ease rotational movement of flange 113 relative to flange 123.

In at least one embodiment, flange 123 includes an inner recessed portion 124 surrounding an opening 127, the recessed portion 124 being sized and shaped to receive a washer 131 and the opening 127 being sized to receive fastener 130b. Typically, opening 127 will have a diameter slightly larger than a diameter of fastener 130b. Washer 131 may provide for first mounting member 110 to more easily rotate relative to second mounting member 120.

Flange 113 may also include an outer recessed portion 116 sized and shaped to receive a washer 133 and/or an insert 132. Washer 133 and/or insert 132 may provide for first mounting member 110 to more easily rotate relative to second mounting member 120. Insert 132 may extend inwardly into opening 127 and fit between an outer surface of fastener 130*b* and an inner surface of opening 127.

Similarly to the presenting portion 115 described above with reference to the first mounting member 110, second mounting member 120 may also include one or more presenting portions. For example, second mounting member 120 may include a presenting portion to provide for an angle indicating label or decal or engraving or the like to provide a visual reference for a user and may indicate an angle formed between the first mounting member 110 and the second mounting member 120.

Turning to FIGS. 8A-8D, illustrated therein is a device 200 for mounting a transducer to a boat, according to at least one embodiment described herein. Device 200 is configured to releasably mount to a transducer of a fish finding device as well as to a portion of a boat. Device 200 is configured to control and/or limit movement of the transducer when the transducer is below a surface of water below the device. Device 200 is configured to provide for the transducer to be properly positioned to operate in at least three modes for example forward mode, down mode and perspective mode.

Device 200 includes the first mounting member 110 and the coupling assembly 130 as described previously with respect to device 100. However, in device 200, second mounting member 220 is configured to provide for a transducer mounted thereto to rotate about an axis A-A (see FIG. 8D) passing through the second mounting member 220 to provide for the transducer to be properly positioned for operation in its perspective mode.

FIGS. 9A-9K show that second mounting member 220 has a greater range of motion relative to first mounting member 110 than second mounting member 120. To provide for the transducer to be properly positioned for operation in its perspective mode, second mounting member 220 is movable to the position shown in FIGS. 9A-9F and provides for third mounting member 240 that secures the second mounting member 220 to the transducer is able to rotate about axis A-A (shown again in FIGS. 9A, 9C, 9I and 9J).

Figure 10:
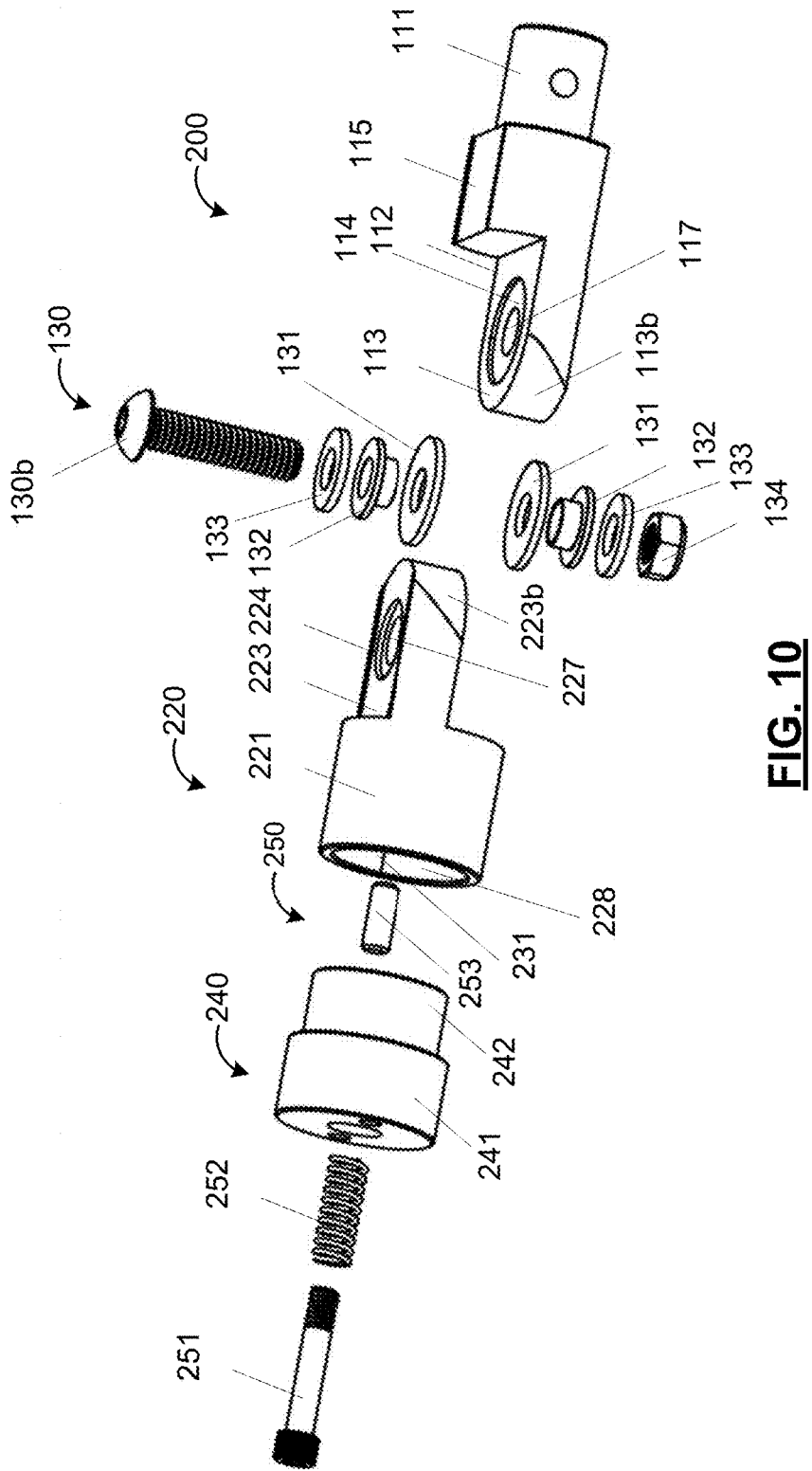
FIG. 10 is an exploded perspective view of the device of FIG. 9A.
Figure 12C:
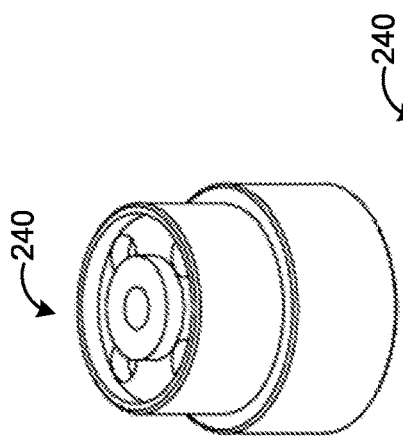
FIG. 12C is a rear perspective view from above of the third member shown in FIG. 9A.
Figure 12F:
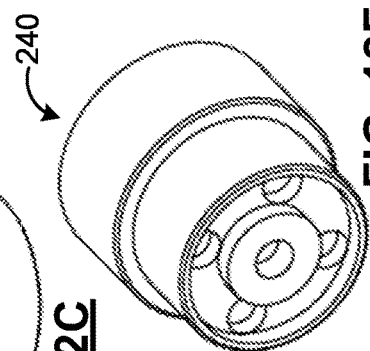
FIG. 12F is a second side view of the third member shown in FIG. 9A.
Figure 12I:
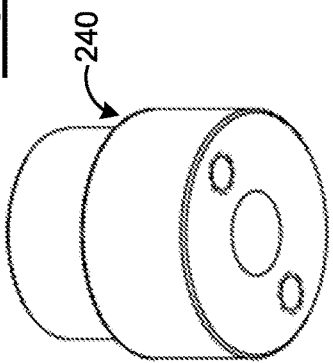
FIG. 12I a rear perspective view from below of the third member shown in FIG. 9A.
Figure 12B:
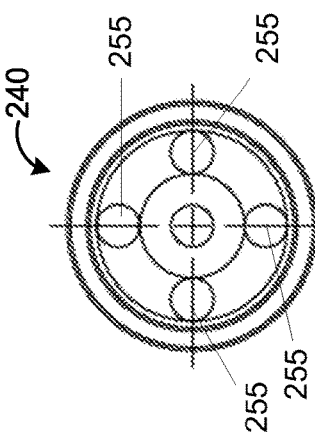
FIG. 12B is a top view of the third member shown in FIG. 9A.
Figure 12E:
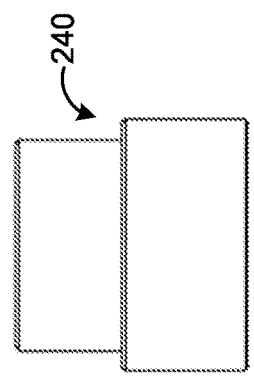
FIG. 12E a first side view of the third member shown in FIG. 9A.
Figure 12H:
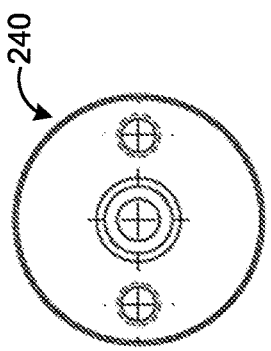
FIG. 12H a bottom view of the third member shown in FIG. 9A.
Figure 12A:
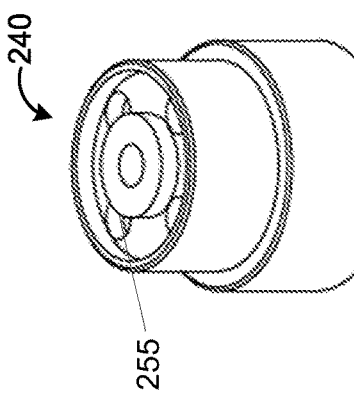
FIG. 12A is a front perspective view from above of a third member of the device of FIG. 9A.
Figure 12D:
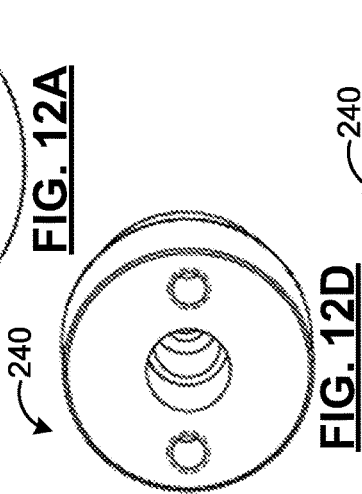
FIG. 12D is a front view of the third member shown in FIG. 9A.
Figure 12G:
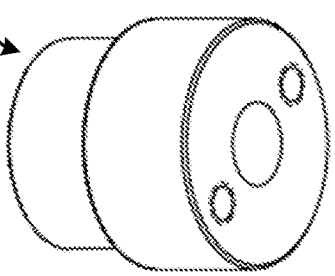
FIG. 12G a front perspective view from below of the third member shown in FIG. 9A.

FIG. 10 shows a perspective exploded view of device 200.

Therein, second mounting member 220 is shown having a coupling flange 223 extending from body 221. It should be understood that coupling flange 223 and its component parts are the same as coupling flange 123, previously described.

Second mounting member 220 is shown in FIGS. 11A-11I. In second mounting member 220, body 221 has an opening 228 at an opposed end 229 to coupling flange 223 leading to a cavity 231. Opening 228 is configured to receive at least a portion of third mounting member 240.

Third mounting member 240 is shown in FIGS. 12A-12I. Third mounting member 240 includes a body 241 and a coupling flange 242 extending outwardly therefrom towards second mounting member 220 (see FIG. 10). Coupling flange 242 is received in cavity 231 when third mounting member 240 is coupled to second mounting member 220.

Device 200 includes a coupling assembly 250 that movable couples the third mounting member 240 to the second mounting member 220. Coupling assembly 250 includes a fastener 251 that is received in an opening 244 of the third mounting member 240 and that passes through the third mounting member 240 into the second mounting member 220.

Fastener 251 is spring biased by a spring 252, so a user may pull outwardly on third mounting member 240 to separate it from second mounting member 220. This is shown in FIGS. 13A and 13B. As third mounting member 240 separates from second mounting member 220, a pin 253 of coupling assembly 250, that is retained in an aperture 235 of second mounting member 220 (see FIG. 11H), can disengage with a corresponding aperture 255 in third mounting member 240 to provide for third mounting member 240 to rotate relative to second mounting member 220. Although FIGS. 12A-12C and 12F show that third mounting member 240 has four apertures 253, third mounting member 240 may include fewer apertures for retaining third mounting member 240 relative to second mounting member 220 after third mounting member 240 has been rotated about axis A-A. In the example shown in FIGS. 12A-12C and 12F, a user may twist the third mounting member 240 in either direction (i.e., clockwise or counterclockwise) to achieve a 90 degree rotation of the third mounting member 240 relative to the second mounting member 220.

Third mounting member 240 generally has a plurality of apertures 255. For example, in the embodiment of device 200 shown in the figures, third mounting member 240 include four apertures 255 equally spaced in a circle to provide for third mounting member 240 to be positionable in one of four rotationally distinct positions relative to second mounting member 220. FIGS. 14A and 14B shown how third mounting member 240 can be separated from second mounting member 220 by being pulled away from second mounting member 220 (see FIG. 14A) and can be rotated (see FIG. 14B) once separated.

Figure 15B:
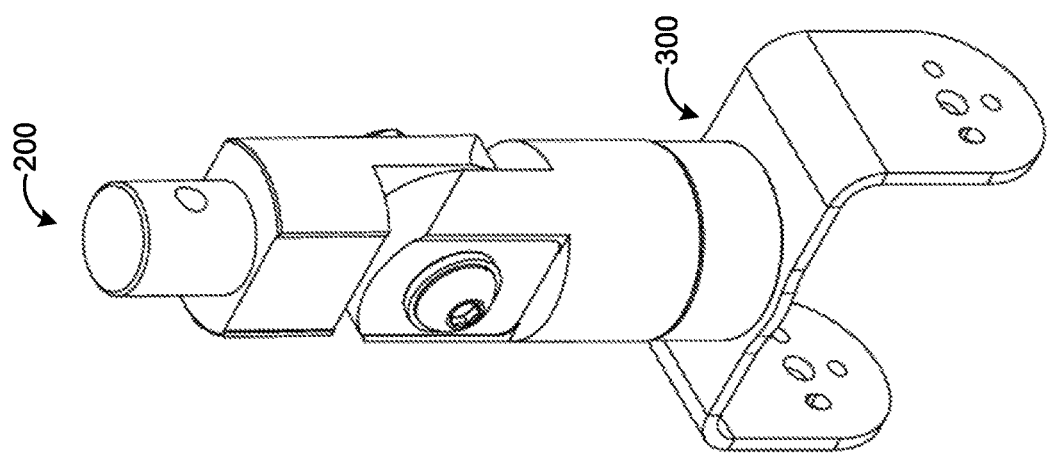
FIG. 15B is a front perspective view from above of the device of FIG. 15A.
Figure 15A:
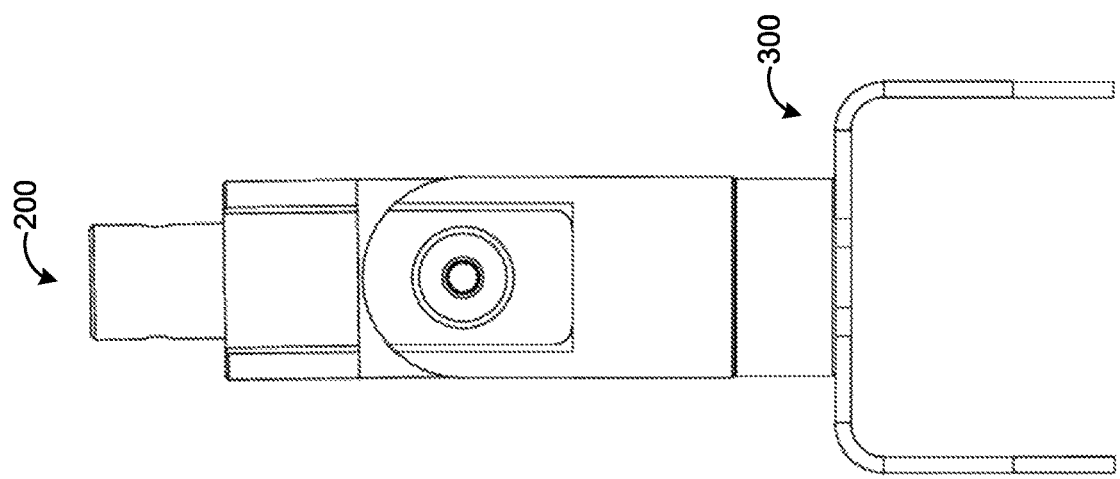
FIG. 15A is a side view of the device of FIG. 9A with a second transducer adapter coupled thereto.

Third mounting member 240 also includes at least one aperture 256 in a lowermost surface thereof to be releasably secured to an adapter of a transducer for being secured to a transducer. One example of an adapter 300 is shown in FIGS. 15A and 15B. As one can imagine, different manufacturers of transducers may require different adaptors for securing the transducer to the device 100 or the device 200. Examples of other adapters 310, 320, 330 and 340 for securing the transducer to the device 100 or the device 200 are shown in FIGS. 16A-16H.

Herein, the second mounting member 220 of the device and the third mounting member 240 are configured such that when a transducer is secured to the third mounting member 240, either directly or indirectly by way of an adaptor or the like, the transducer is aligned with a longitudinal axis of at least a portion of the device 200 when the transducer is positioned to be operated in its forward mode and its down mode and its perspective mode.

Figures 17A, 17B:
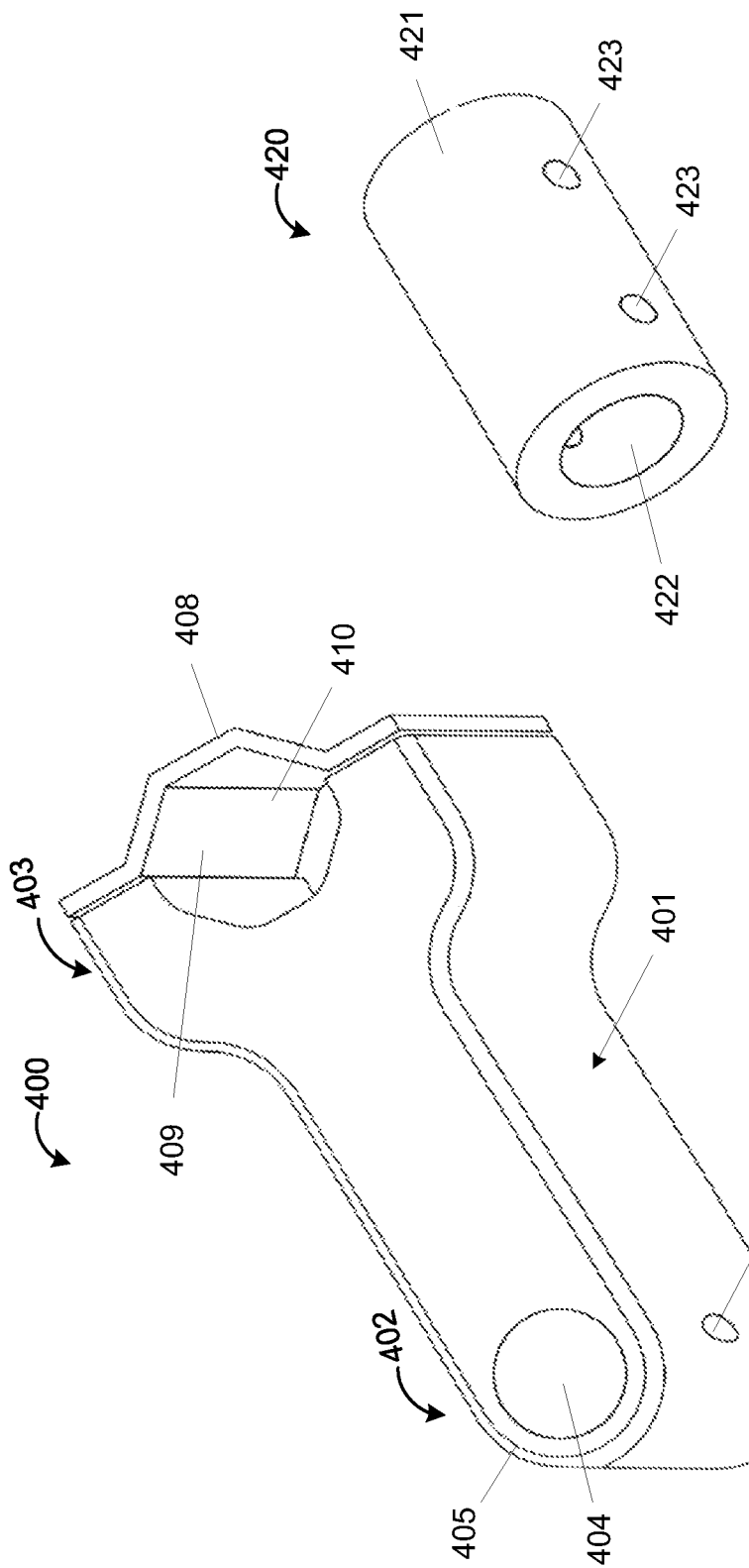
FIG. 17A is a top perspective view of an adaptor for connecting one of the devices described herein to a pole for mounting to a boat, according to at least one embodiment described herein.
FIG. 17B is a top perspective view of an adaptor for connecting one of the devices described herein to a pole for mounting to a boat, according to another embodiment described herein.

FIG. 17A shows a perspective view of an adaptor 400 for connecting one of the devices described herein, such as but not limited to device 100 or device 200, to a pole for mounting to a boat. Device 400 main include a body 401 having a first end 402 and a second end 403. As shown therein, first end 402 is configured to be received on coupling member 111 of device 100. First end 402 may include an aperture 404 extending through body 401 and openings 405 extending outwardly from aperture 404 through a side wall 406 defining aperture 404. Openings 405 are sized and shaped to receive depressible protrusions of coupling member 111 to releasably couple to coupling member 111.

Second end 403 is configured to mount to a pole. For example, adaptor 400 may include a moveable component 408 that extends outwardly from second end 403 of body 401 and is movably securable thereto. Movable component 408 may be shaped to receive a portion of a pole between an inner surface 409 of moveable component 408 that faces second end 403 of body 401. Moveable component 408 may be movable between a first position where the pole is receivable in aperture 410 formed between inner surface 409 and second end 403 and a second position where the inner surface 409 is pressed against the pole to frictionally retain the pole within aperture 410.

FIG. 17B shows a perspective view of a second adaptor 420 for connecting one of the devices described herein, such as but not limited to device 100 or device 200, to a pole for mounting to a boat. Second adaptor 420 includes a cylindrical outer wall 421 defining an aperture 422 extending through cylindrical outer wall 421 along a longitudinal axis thereof. One or more secondary apertures 423 extends outwardly from aperture 421 through the cylindrical outer wall 421.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A device for mounting a transducer to a boat, the device comprising:
    a first mounting member having a body and a coupling portion extending outwardly from the body, the coupling portion being configured to be directly or indirectly releasably coupled to a portion of the boat;
    a second mounting member movably coupled to the first mounting member, the second mounting member having a body having a coupling portion extending outwardly from the body;
    a third mounting member movably coupled to the second mounting member and configured to be releasably secured to the transducer, the third mounting member being spring-biased towards the second mounting member;
    a first coupling assembly rotatably coupling the coupling portion of the first mounting member to the coupling portion of the second mounting member such that, when the transducer is secured to the third mounting member the transducer is rotatable about a first axis between a first position where the transducer is operable in a first mode and a second position where the transducer is operable in a second mode; and
    a second coupling assembly rotatably coupling the second mounting member to the third mounting member such that, when the transducer is secured to the third mounting member the transducer is rotatable about a second axis between the first position where the transducer is operable in the first mode and a third position where the transducer is operable in a third mode, the first axis being transverse to the second axis;
    wherein, the second axis passes through the transducer when:
    the transducer is secured to the device and the device is in the first position; and
    the transducer is secured to the device and the device is in the third position.

2. The device of claim 1, wherein the first axis is defined by a first fastener of the first coupling assembly.

3. The device of claim 1, wherein the second axis is defined by a second fastener of the second coupling assembly.

4. The device of claim 3, wherein the second coupling assembly includes a spring that surrounds the second fastener of the second coupling assembly.

5. The device of claim 4, wherein the second coupling assembly further comprises a pin retained within a cavity of the second mounting member.

6. The device of claim 5, wherein the third mounting member includes a plurality of apertures in an upper surface thereof, each aperture being configured to receive the pin to restrict rotational movement of the third mounting member relative to the second mounting member.

7. A method of mounting a transducer to a boat, the method comprising:
    securing the transducer to the device of claim 1, and securing the device of claim 1 to the boat.

* * * * *